(12) United States Patent
Yang

(10) Patent No.: US 8,573,577 B2
(45) Date of Patent: Nov. 5, 2013

(54) POINT-WELDING CLAMP STRUCTURE

(76) Inventor: Jen Yung Yang, Taichung (TW)

( * ) Notice: Subject to any disclaimer, the term of this patent is extended or adjusted under 35 U.S.C. 154(b) by 323 days.

(21) Appl. No.: 13/078,194

(22) Filed: Apr. 1, 2011

(65) Prior Publication Data

US 2012/0248672 A1  Oct. 4, 2012

(51) Int. Cl.
*B25B 1/00* (2006.01)
*B25B 1/20* (2006.01)
*B25B 1/22* (2006.01)
*B25B 1/02* (2006.01)
*B25B 1/10* (2006.01)
*B25B 1/24* (2006.01)
*B23Q 3/02* (2006.01)

(52) U.S. Cl.
USPC ........ 269/240; 269/3; 269/6; 269/45; 269/71; 269/95; 269/143; 269/249; 269/189; 269/275; 269/263

(58) Field of Classification Search
USPC .............. 269/240, 3, 6, 45, 71, 95, 143, 249, 269/189, 275, 263
See application file for complete search history.

(56) References Cited

U.S. PATENT DOCUMENTS 7,108,461 B1 * 9/2006 Colburn et al. ............... 409/131

* cited by examiner

*Primary Examiner* — Monica Carter
*Assistant Examiner* — Nirvana Deonauth
(74) *Attorney, Agent, or Firm* — Guice Patents PLLC

(57) ABSTRACT

A point-welding clamp structure for side by side tightly clamping and locating different plate-shaped metal pieces in their true relative positions so as to facilitate the point-welding operation. The point-welding clamp structure includes a body section and a base section for clamping the different metal pieces. A second adjustment section is disposed on the body section and a third adjustment section is disposed on the base section. By means of operating the second and third adjustment sections, the metal pieces with different thickness can be securely clamped and located by the point-welding clamp structure.

8 Claims, 6 Drawing Sheets

POINT-WELDING CLAMP STRUCTURE

BACKGROUND OF THE INVENTION

1. Field of the Invention

The present invention relates generally to a metal processing technique, and more particularly to an improved point-welding clamp structure.

2. Description of the Related Art

In the field of metal processing, different metal pieces are generally connected with each other by means of welding. Point-welding technique is widely applied to various fields not only including industrial product manufacturing, but also daily implement manufacturing. For example, point-welding technique is often applied to car body repair for recovering or modifying the original configuration of the car body. FIG. 1 shows a conventional point-welding clamp 1 for fixing the metal pieces in their true relative positions to facilitate the successive welding operation.

In structure, the conventional point-welding clamp 1 includes a frame-like main body 2 and a connection plate 3. The main body 2 has an opening 4 on a first side. The connection plate 3 has a first end and a second end. The first end of the connection plate 3 extends out of the main body 2 through the opening 4. The second end of the connection plate 3 has a threaded rod 5 passing through a second side of the main body 2. A nut 6 is screwed on the threaded rod 5. A press bar 7 is fitted through a perforation 8 formed at the first end of the connection plate 3 in adjacency to the main body 2.

In use, an operator inserts two different metal pieces to be welded together between the main body 2 and the press bar 7 with the adjacent edges of the metal pieces in abutment with two sides of the connection plate 3. By means of the nut 6, the connection plate 3 can be driven and displaced to tightly clamp and locate the metal pieces between the main body 2 and the press bar 7. Under such circumstance, the operator can perform point-welding operation to the two metal pieces.

In practice, the different metal pieces often have unequal thickness. However, the gap between the main body 2 and the press bar 7 of the conventional point-welding clamp 1 is uniform. Therefore, when using the conventional point-welding clamp 1 to clamp and locate two different metal pieces with different thickness, the metal pieces can be hardly both securely clamped and located. As a result, the application range of the conventional point-welding clamp 1 is limited.

SUMMARY OF THE INVENTION

It is therefore a primary object of the present invention to provide an improved point-welding clamp structure for securely clamping and locating different metal pieces with different thickness so as to facilitate the point-welding operation.

To achieve the above and other objects, the point-welding clamp structure of the present invention includes a body section, a connection section, a base section, a first adjustment section, a second adjustment section and a third adjustment section. The body section has a main body. The main body has a first abutment face formed on a sidewall of the main body. The connection section has a connection body with a predetermined length. The connection body has a lengthwise first end and a lengthwise second end. The lengthwise first end is slidably connected on the main body, while the lengthwise second end outward protrudes from the first abutment face. A perforation is formed through the lengthwise second end of the connection body that outward protruding from the first abutment face. The base section has a bar body slidably fitted in the perforation. The bar body has a second abutment face formed on one side of the bar body opposite to the first abutment face.

The first adjustment section cooperates with the second or the third adjustment section. The first adjustment section is disposed at the lengthwise first end of the connection body for adjusting the distance between the perforation and the first abutment face.

The second adjustment section is disposed on the main body and movable between a protrusion position and a retraction position. When positioned in the protrusion position, a first end of the second adjustment section outward protrudes from the first abutment face. When positioned in the retraction position, the first end of the second adjustment section is retracted without protruding from the first abutment face.

The third adjustment section is disposed on the bar body and movable between a protrusion position and a retraction position. When positioned in the protrusion position, a first end of the third adjustment section outward protrudes from the second abutment face. When positioned in the retraction position, the first end of the third adjustment section is retracted without protruding from the second abutment face.

The present invention can be best understood through the following description and accompanying drawings, wherein:

DETAILED DESCRIPTION OF THE PREFERRED EMBODIMENT

Figure 1:
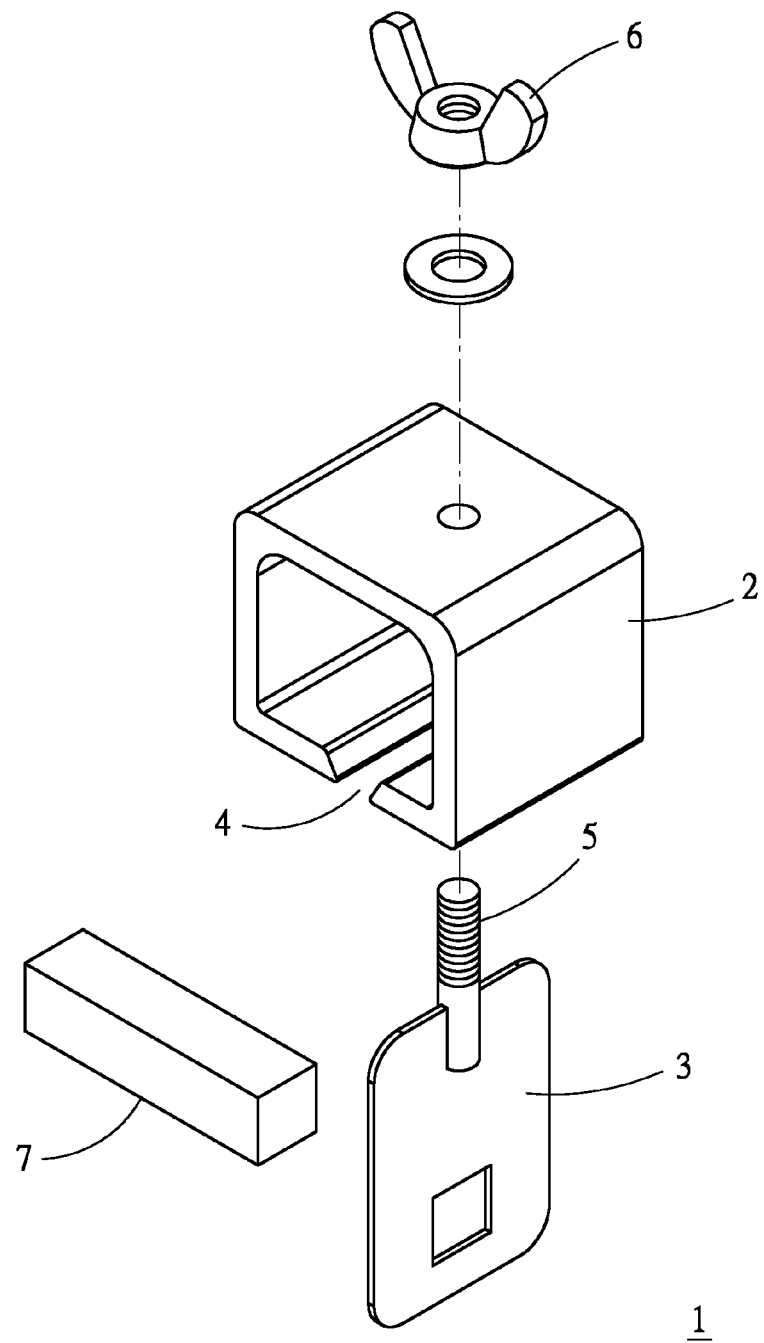
FIG. 1 is a perspective exploded view of a conventional point-welding clamp.
Figure 2:
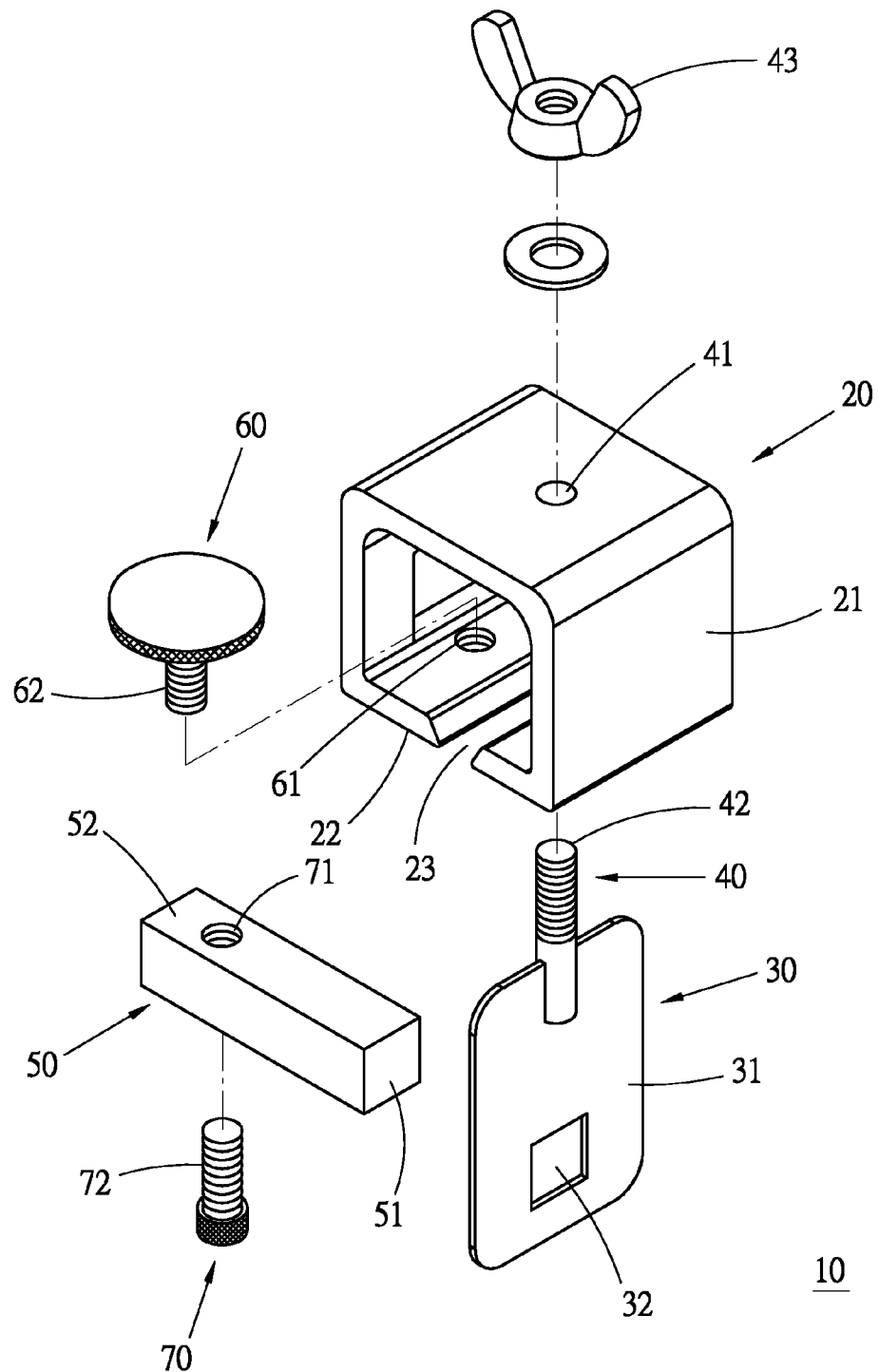
FIG. 2 is a perspective exploded view of a preferred embodiment of the present invention.
Figure 3:
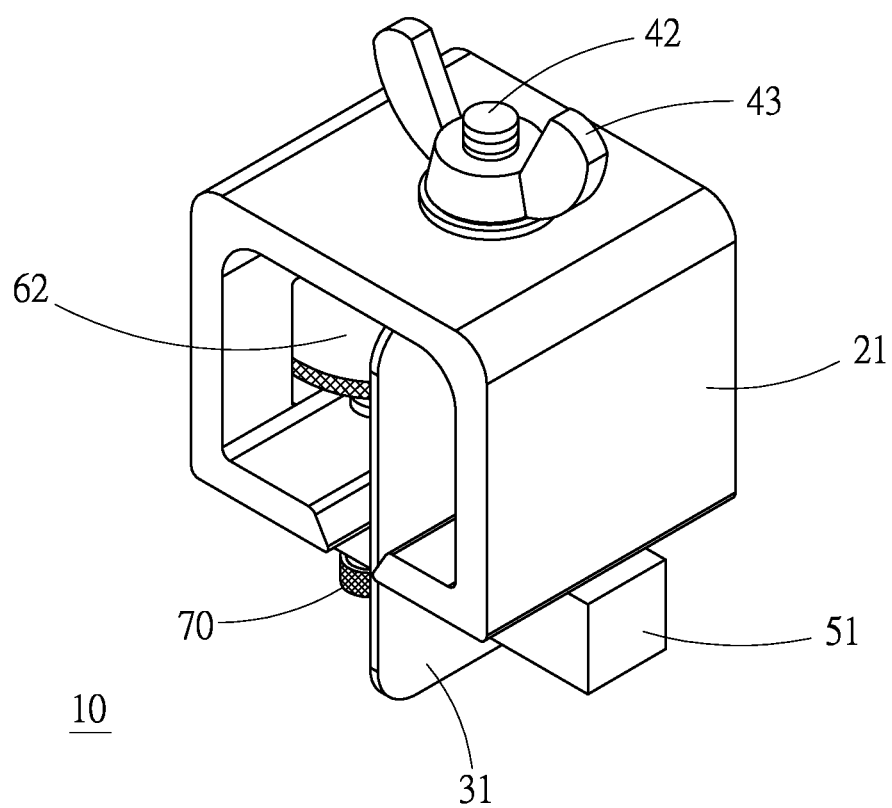
FIG. 3 is a perspective assembled view of the preferred embodiment of the present invention.

Please refer to FIGS. 2 and 3. According to a preferred embodiment, the point-welding clamp structure 10 of the present invention includes a body section 20, a connection section 30, a first adjustment section 40, a base section 50, a second adjustment section 60 and a third adjustment section 70. The body section 20, the connection section 30, the first adjustment section 40 and the base section 50 pertain to prior art.

The body section 20 has a hollow main body 21 in the form of a substantially rectangular frame body. The main body 21 has a first abutment face 22 formed on a bottom wall of the main body 21 and an opening 23 formed through the bottom wall of the main body 21.

The connection section 30 has an elongated thin plate-like connection body 31 having a lengthwise top end and a lengthwise bottom end. The lengthwise top end is positioned in the interior of the main body 21, while the lengthwise bottom end downward extends from the opening 23 and protrudes from the first abutment face 22. A rectangular perforation 32 is formed through the lengthwise bottom end of the connection body 31 and positioned under the first abutment face 22.

The first adjustment section 40 (upper adjustment section) has a first slide hole 41 formed through a top wall of the main body 21, and a first bolt 42 having a top end and a bottom end. The bottom end of the first bolt 42 is fixedly connected with the lengthwise top end of the connection body 31, while the top end of the first bolt 42 passes through the first slide hole 41 and is positioned above the main body 21. The first adjustment section 40 further has an adjustment nut 43 screwed on the top end of the first bolt 42 in abutment with upper face of the top wall of the main body 21.

The base section 50 has a rectangular solid bar body 51 with a cross-sectional shape complementary to that of the perforation 32. The bar body 51 is slidably fitted in the perforation 32. The bar body 51 has a second abutment face 52 formed on a top face of the bar body 51 opposite to the first abutment face 22.

The second adjustment section 60 (intermediate adjustment section) has a second threaded hole 61 upward perpendicularly extending from the first abutment face 22 through the bottom wall of the main body 21. The second adjustment section 60 further has a second bolt 62 screwed in the second threaded hole 61. A bottom end of the second bolt 62 can downward protrude from the first abutment face 22. In other words, the second bolt 62 can be screwed within the second threaded hole 61 between a protrusion position and a retraction position. When positioned in the protrusion position, the bottom end of the second bolt 62 downward protrudes from the first abutment face 22. When positioned in the retraction position, the bottom end of the second bolt 62 is retracted into the second threaded hole 61 without protruding from the first abutment face 22.

The third adjustment section 70 (lower adjustment section) has a third threaded hole 71 downward perpendicularly extending from the second abutment face 52 through the bar body 51. The third adjustment section 70 further has a third bolt 72 screwed in the third threaded hole 71. A top end of the third bolt 72 can upward protrude from the second abutment face 52. In other words, the third bolt 72 can be screwed within the third threaded hole 71 between a protrusion position and a retraction position. When positioned in the protrusion position, the top end of the third bolt 72 upward protrudes from the second abutment face 52. When positioned in the retraction position, the top end of the third bolt 72 is retracted into the third threaded hole 71 without protruding from the second abutment face 52.

According to the above arrangement, in use of the point-welding clamp structure 10, the edges of a first plate-like metal board 81 and a second plate-like metal board 82 to be welded are inserted between the first and second abutment faces 22, 52 and positioned on two sides of the connection body 31. Then, by means of screwing the adjustment nut 43, the distance between the first and second abutment faces 22, 52 is shortened to clamp and fix the metal boards 81, 82 in their true relative positions so as to facilitate the point-welding operation.

Figure 4:
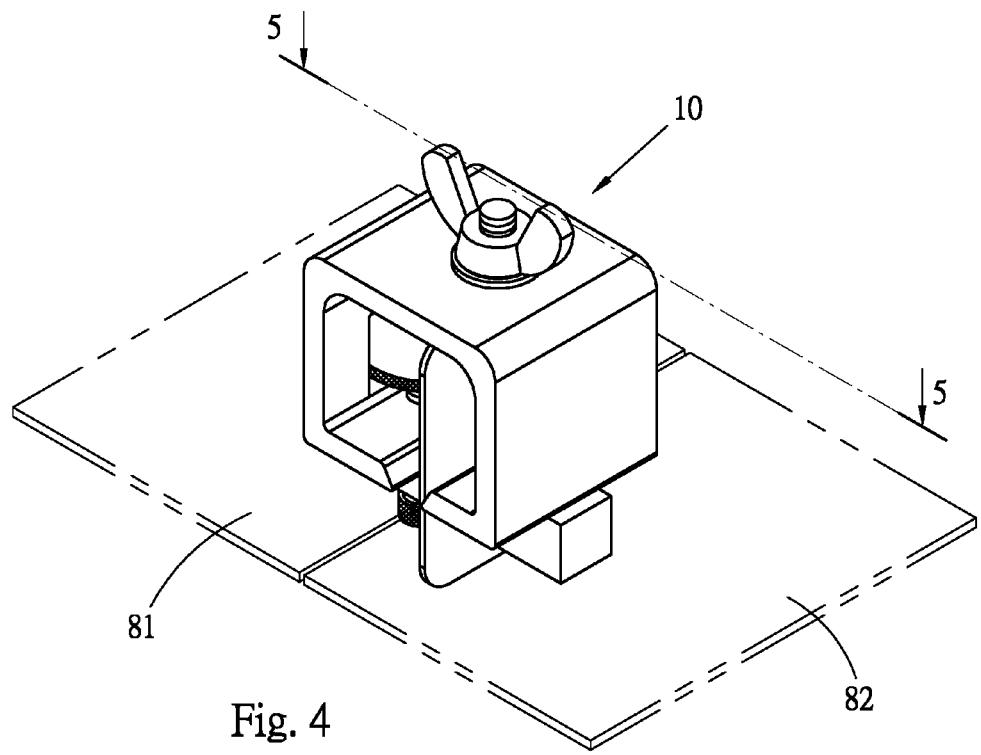
FIG. 4 is a perspective assembled view of the preferred embodiment of the present invention, showing the use of the present invention in one state.
Figure 5:
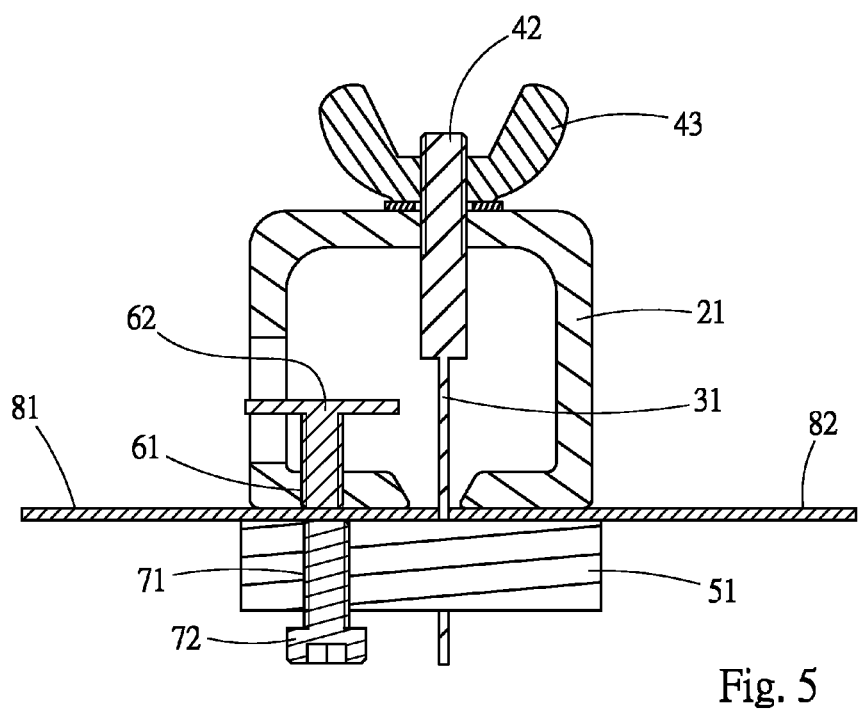
FIG. 5 is a sectional view taken along line 5-5 of FIG. 4.
Figure 6:
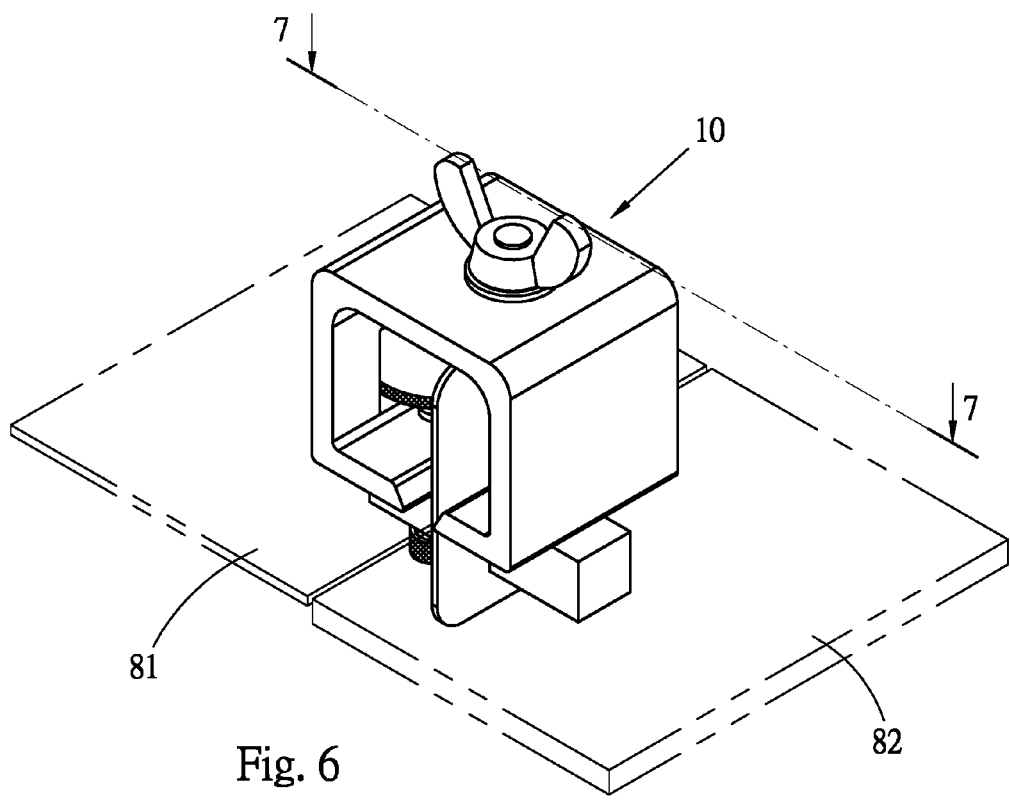
FIG. 6 is a perspective assembled view of the preferred embodiment of the present invention, showing the use of the present invention in another state.
Figure 7:
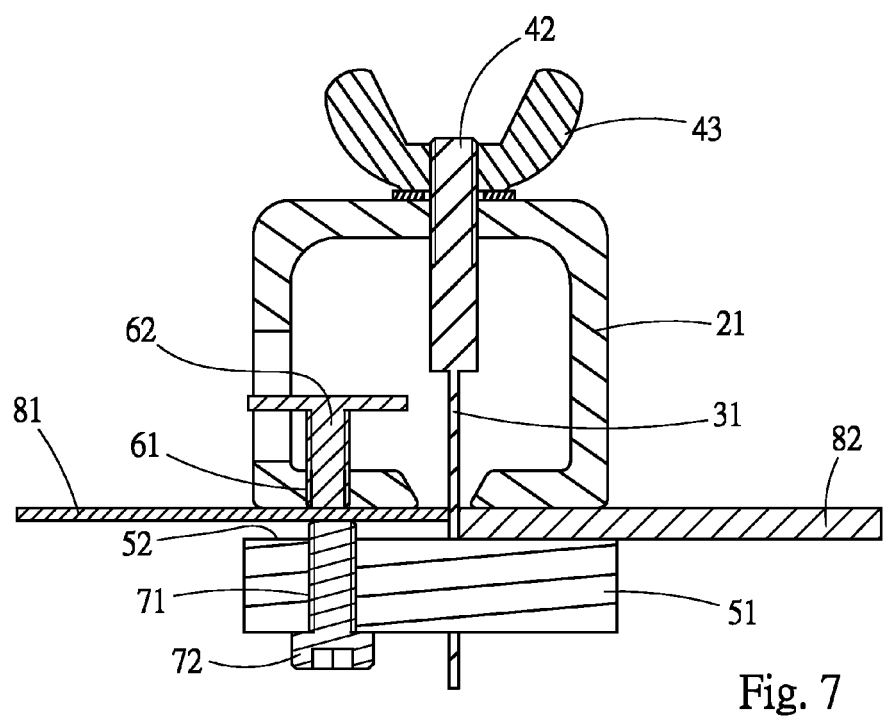
FIG. 7 is a sectional view taken along line 7-7 of FIG. 6.
Figure 8:
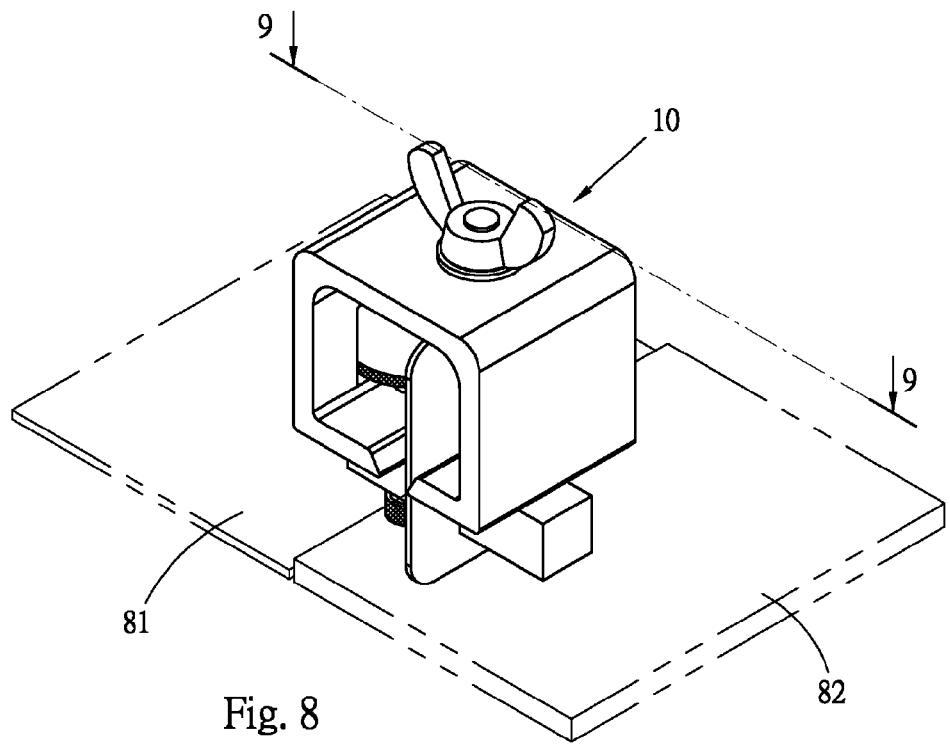
FIG. 8 is a perspective assembled view of the preferred embodiment of the present invention, showing the use of the present invention in still another state.
Figure 9:
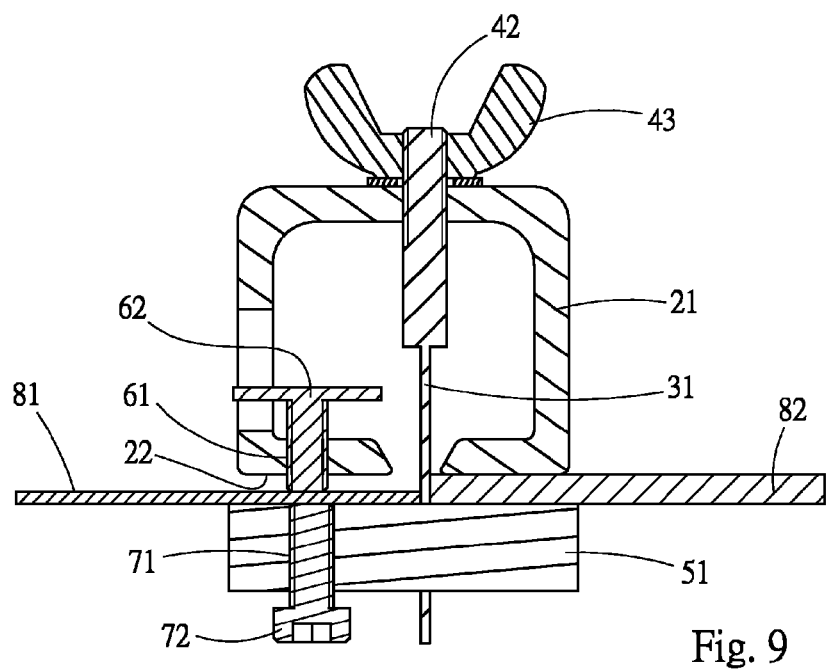
FIG. 9 is a sectional view taken along line 9-9 of FIG. 8.

In practice, the metal boards 81, 82 may have equal or unequal thickness. In the case that the metal boards 81, 82 have equal thickness as shown in FIGS. 4 and 5, the second and third bolts 62, 72 are respectively positioned in their retraction positions, whereby the upper and lower faces of the edges of the metal boards 81, 82 respectively attach to the first and second abutment faces 22, 52. In this case, the metal boards 81, 82 are tightly clamped and located between the first and second abutment faces 22, 52.

In the case that the first metal board 81 has a thickness smaller than that of the second metal board 82, after the first and second metal boards 81, 82 are aligned with each other, the second bolt 62 or the third bolt 72 are adjusted to the protrusion position with the bottom end of the second bolt 62 or the top end of the third bolt 72 in abutment with the face of the first metal board 81 as shown in FIGS. 6 and 7 or FIGS. 8 and 9. Accordingly, the metal boards 81, 82 can be securely clamped and located to facilitate the point-welding operation.

The above embodiment is only used to illustrate the present invention, not intended to limit the scope thereof. Many modifications of the above embodiment can be made without departing from the spirit of the present invention.

What is claimed is:

1. A point-welding clamp structure comprising:
   a body section having a main body, the main body having a first abutment face formed on a bottom wall of the main body;
   a connection section having a connection body with a predetermined length, the connection body having a lengthwise first end and a lengthwise second end, the lengthwise first end being located in the main body, while the lengthwise second end outward protruding from the first abutment face, a perforation being formed through the lengthwise second end of the connection body that outward protruding from the first abutment face;
   a first adjustment section disposed at the lengthwise first end of the connection body for adjusting the distance between the perforation and the first abutment face; and
   a base section having a bar body slidably fitted in the perforation, the bar body having a second abutment face formed on one side of the bar body opposite to the first abutment face; the point-welding clamp structure being characterized in that the point-welding clamp structure further comprises a second adjustment section disposed on the main body and movable between a protrusion position and a retraction position, when positioned in the protrusion position, a first end of the second adjustment section outward protruding from the first abutment face, when positioned in the retraction position, the first end of the second adjustment section being retracted without protruding from the first abutment face.

2. The point-welding clamp structure as claimed in claim 1, wherein the second adjustment section has a threaded hole inward perpendicularly extending from the first abutment face through the main body, the second adjustment section further having a bolt screwed in the threaded hole.

3. The point-welding clamp structure as claimed in claim 1, further comprising a third adjustment section disposed on the bar body and movable between a protrusion position and a retraction position, when positioned in the protrusion position, a first end of the third adjustment section outward protruding from the second abutment face, when positioned in the retraction position, the first end of the third adjustment section being retracted without protruding from the second abutment face.

4. The point-welding clamp structure as claimed in claim 3, wherein the third adjustment section has a threaded hole inward perpendicularly extending from the second abutment face through the bar body, the third adjustment section further having a bolt screwed in the threaded hole.

5. A point-welding clamp structure comprising:
   a body section having a main body, the main body having a first abutment face formed on a bottom wall of the main body;

a connection section having a connection body with a predetermined length, the connection body having a lengthwise first end and a lengthwise second end, the lengthwise first end being located in the main body, while the lengthwise second end outward protruding from the first abutment face, a perforation being formed through the lengthwise second end of the connection body that outward protruding from the first abutment face;

an upper adjustment section disposed at the lengthwise first end of the connection body for adjusting the distance between the perforation and the first abutment face; and a base section having a bar body slidably fitted in the perforation, the bar body having a second abutment face formed on one side of the bar body opposite to the first abutment face; the point-welding clamp structure being characterized in that the point-welding clamp structure further comprises a lower adjustment section disposed on the bar body and movable between a protrusion position and a retraction position, when positioned in the protrusion position, a first end of the lower adjustment section outward protruding from the second abutment face, when positioned in the retraction position, the first end of the lower adjustment section being retracted without protruding from the second abutment face.

6. The point-welding clamp structure as claimed in claim 5, wherein the lower adjustment section has a threaded hole inward perpendicularly extending from the second abutment face through the bar body, the lower adjustment section further having a bolt screwed in the threaded hole.

7. The point-welding clamp structure as claimed in claim 5, further comprising an intermediate adjustment section disposed on the main body and movable between a protrusion position and a retraction position, when positioned in the protrusion position, a first end of the intermediate adjustment section outward protruding from the first abutment face, when positioned in the retraction position, the first end of the intermediate adjustment section being retracted without protruding from the first abutment face.

8. The point-welding clamp structure as claimed in claim 5, wherein an intermediate adjustment section has a threaded hole inward perpendicularly extending from the first abutment face through the main body, the intermediate adjustment section further having a bolt screwed in the threaded hole.

\* \* \* \* \*